UNITED STATES PATENT OFFICE.

ISAAC J. MOORE, OF VIOLA, DELAWARE.

FLUX.

SPECIFICATION forming part of Letters Patent No. 242,674, dated June 7, 1881.

Application filed April 4, 1881. (No specimens.)

*To all whom it may concern:*

Be it known that I, ISAAC J. MOORE, of Viola, in the county of Kent and State of Delaware, have invented certain new and useful Improvements in Fluxes; and I do hereby declare the following to be a full, clear, and exact description of the invention, such as will enable others skilled in the art to which it pertains to make and use it.

My invention relates to an improvement in fluxes; and it consists in combining together calcined borax, carbonate of soda, and pulverized fuller's-earth, in or about the proportions as will be more fully described hereinafter.

In making enough of my flux to form five ounces, I take one ounce of calcined borax, one ounce of carbonate of soda, and three ounces of pulverized fuller's-earth. These ingredients, after being mixed together, are reduced to a fine powder or dust.

When the metal which is to be welded is at a cherry-heat, a suitable quantity of the powder is sprinkled over that portion of the metal which is to receive the weld, and the metal is then heated to a good fusible heat.

This compound is composed of ingredients which are very cheap and easily prepared for use. After the flux has been applied to the metal, there is no fusing up of the compound, and the flux is ready for use at once. By the use of this flux a strong and reliable weld can be produced, and the flux protects the metal from atmospheric action so completely that even cast-steel can be worked under a glowing white heat without injury to the metal. By its use iron can be welded to iron, or iron to steel, steel to steel, or cast-iron to wrought-iron, and will answer every purpose for braziers' use.

Having thus described my invention, I claim—

A flux composed of pulverized fuller's-earth, carbonate of soda, and calcined borax, in or about the proportions specified.

In testimony whereof I affix my signature in presence of two witnesses.

ISAAC J. MOORE.

Witnesses:
WILLIAM H. EDMONDS,
JONATHAN G. GRAHAM.